Aug. 11, 1959   H. J. CARLIN   2,899,640
BROADBAND POWER METER
Filed May 6, 1953   2 Sheets-Sheet 1
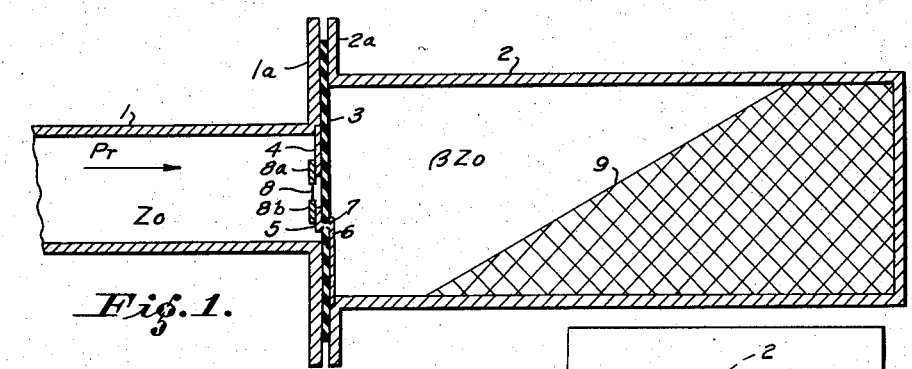
Fig. 1.
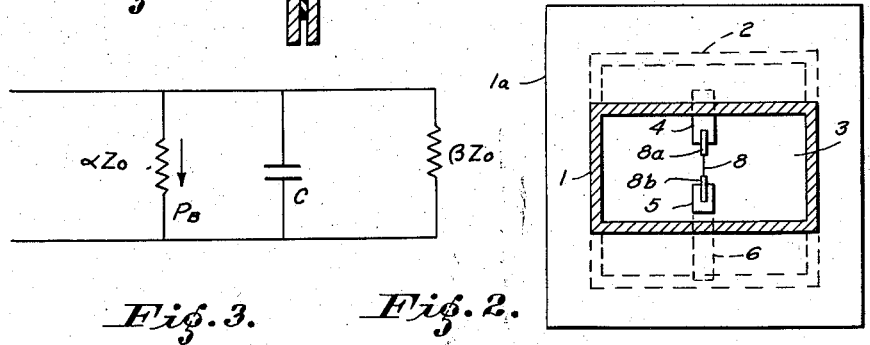
Fig. 3.   Fig. 2.
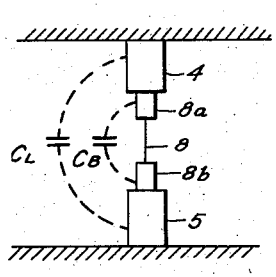   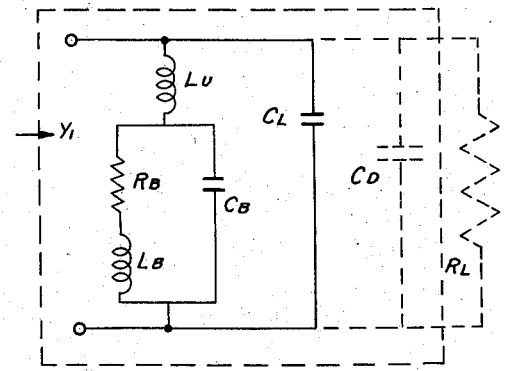
Fig. 4.   Fig. 5.
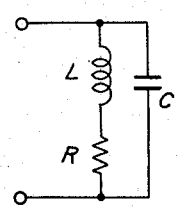
Fig. 6.
INVENTOR.
HERBERT J. CARLIN
BY  Ralph B. Stewart
ATTORNEY.

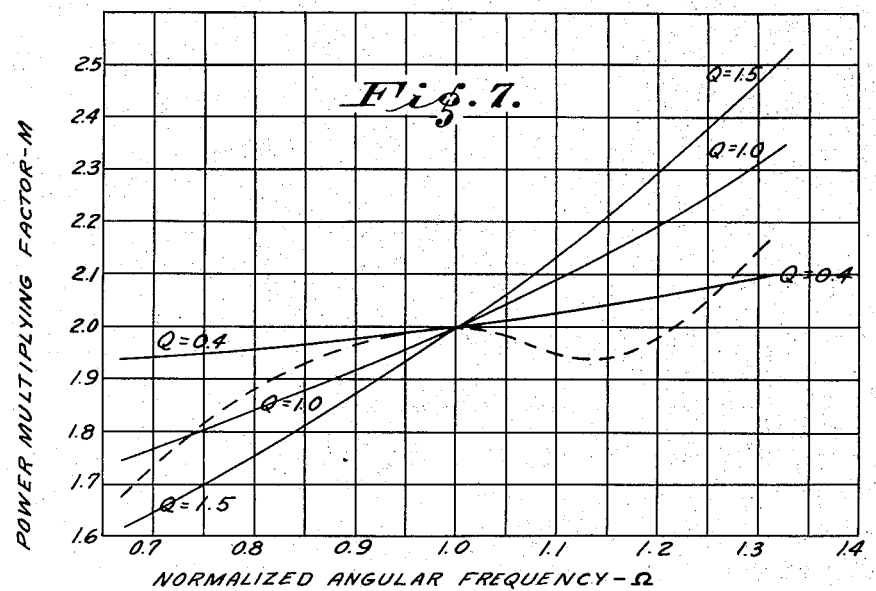
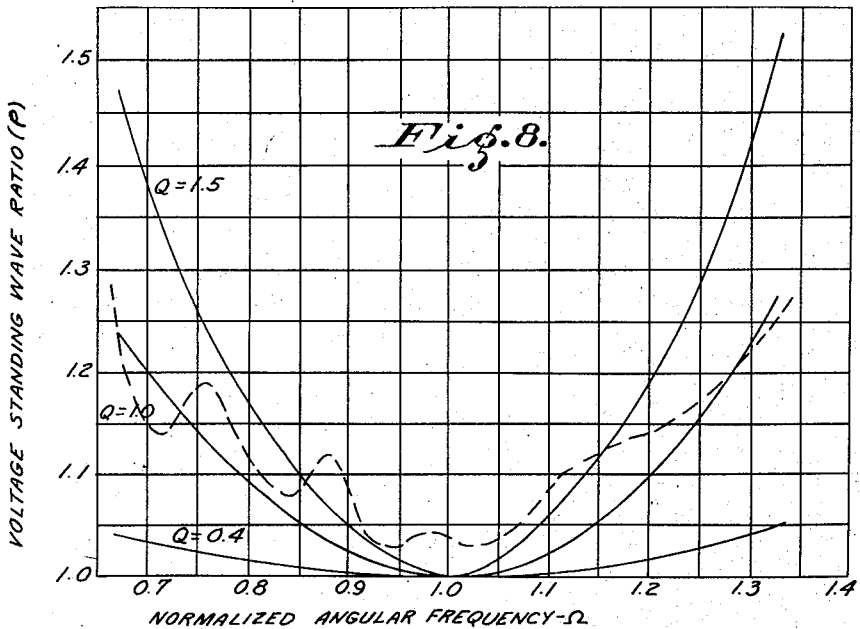

United States Patent Office 2,899,640
Patented Aug. 11, 1959

2,899,640

BROADBAND POWER METER

Herbert J. Carlin, East Orange, N.J., assignor to Polytechnic Institute of Brooklyn, Brooklyn, N.Y., a corporation of New York Application May 6, 1953, Serial No. 353,381

7 Claims. (Cl. 324—95)

This invention relates to an electric meter for the measurement of electromagnetic wave energy in the microwave frequency range.

An object of the invention is to produce a power meter of broadband characteristic and having low reflection loss for frequencies above 8000 mc. per second.

Another object of the invention is to devise a power meter of broadband characteristic and which does not require tuning adjustments.

The objects of my invention are realized in a power meter in which the input power is divided in a definite ratio between a bolometer element and a load embodied in the meter. A characteristic feature of my invention is that the load is embodied in an over-sized section of the waveguide joined to a section of normal size by an abrupt step in the waveguide, and the bolometer element is mounted in the waveguide at the junction or step between the two guide sections.

At the present time, no power meters are available which have low reflections over the recommended frequency range of any of the waveguide sizes for frequencies above 8200 mc. per second. Power meters that are in use generally utilize a bolometer element or thermistor backed by a short-circuit separated from the plane of the bolometer by a quarter-wavelength of guide at the mid-band frequency. Therefore, at the center of a specified operating frequency band the guide would be effectively terminated in the bolometer impedance. An arrangement of this sort is inherently operable over only a narrow band of frequencies since the quarter-wave short-circuit introduces a large reactive mismatch at the edges of the frequency band. If a 2-to-1 range in guide wavelength is assumed, and the short-circuit is presumed to be adjusted to a quarter-wavelength at the arithmetic band center (corresponding to the mean guide wavelength over the frequency band), then the magnitude of normalized susceptance introduced at the edges of the band is:

$$\left|\frac{B_{sc}}{Y_o}\right| = \left|\cot \frac{\pi}{2} \times \frac{4}{3}\right| = .577 \quad (1)$$

$B_{sc}$ being the non-normalized susceptance and $Y_o$ the characteristic admittance.

An ideal bolometer with unit resistance and zero susceptance over the band and terminated in the short-circuit of Equation 1 has a VSWR of 1.8 at the band limits. Actual units have much higher reflections than this, since physical bolometers have insertion VSWR's considerably greater than unity over broadbands. A typical commercial unit for the frequency band 18.0 to 26.5 kmc. per second had a measured voltage standing wave ratio of 3.0 at the edge of the band. The amount of mismatch introduced by a bolometer backed by a reactive section of guide is reduced if the susceptance of the termination is made as small as possible over the required band of operation. Analytic investigation and experience, however, indicated that in a lossless guide it would be extremely difficult to obtain performance substantially superior to the quarter-wave shorted length of guide. This is because special configurations involving over-size guide or cut-off lengths of guide generally introduce discontinuity effects which prevent any considerable reduction in overall susceptance level.

The power meter of my invention is not lossless, but has a known amount of loss of approximately 3.0 db designed into the casing to help achieve the required broadband match. The resulting instrument has no tuning adjustments whatever and is extremely simple in mechanical design.

My invention is illustrated in the accompanying drawing in which:

Figure 1 is a longitudinal sectional view of a power meter according to my invention;

Figure 2 is an elevational view of Figure 1 as seen from the left of Figure 1;

Figure 3 is an approximate equivalent circuit of the meter shown in Figures 1 and 2;

Figure 4 is a diagrammatic showing of the bolometer element in the meter;

Figure 5 shows a first order equivalent circuit of the bolometer element; and

Figure 6 shows a simplified equivalent circuit for the bolometer element.

Fig. 7 is a graph of power-multiplying factor as a function of normalized frequency.

Fig. 8 is a graph of voltage standing wave ratio as a function of normalized frequency.

Referring to the drawing, a preferred embodiment of my invention is illustrated somewhat diagrammatically in Figures 1 and 2. The wave energy to be measured is received through a waveguide section 1 having standard or normal dimensions for the propagation of wavelengths within the frequency band to be measured. The received energy is supplied from section 1 to a second waveguide section 2 of over-size dimension. From considerations which will be explained hereinafter, it is preferred to form waveguide section 2 of twice the height of section 1, both sections being of the same width, but a different ratio of height dimensions may be used if desired. The two waveguide sections are secured together in alignment by coupling flanges 1a and 2a, with a sheet of insulating material 3, such as a thin sheet of mica, interposed between the two sections. The two coupling flanges are clamped together by suitable clamping means (not shown) which maintain the two waveguide sections insulated from each other. On one face of sheet 3, preferably on the forward face, is mounted a pair of metallic strips 4 and 5. These strips are aligned vertically at the center of section 1 and bolometer wire 8 bridges the gap between these strips at the center of section 1. As shown in Figures 1 and 2, the upper end of strip 4 extends above the plane of the top wall of section 1 and is clamped between flange 1a and plate 3, thus connecting one end of the bolometer wire to section 1. The lower end of the bolometer wire is connected to section 2 by means of a metallic strip 6 mounted on the rear face of plate 3 and extending down below the plane of the lower wall of section 2 with the lower end thereof clamped between the flange 2a and plate 3. The upper end of strip 6 is connected to strip 5 by a connection 7 extending through an opening in plate 3.

The bolometer wire is formed of Wollaston wire which consists of a core of very thin platinum wire surrounded or plated by a jacket of silver. For example, it is preferred to use a bolometer wire in which the platinum core has a diameter of approximately $30 \times 10^{-6}$ inches and the silver jacket has an outside diameter of approximately $10^{-3}$ inches. The length of Wollaston wire is sufficiently long so that it bridges the gap between strips 4 and 5. Over a central portion of the wire, as shown at 8, the silver jacket is removed as by etching, and the plated terminal portions 8a and 8b are suitably bonded to strips 4 and 5 as by soldering. It will be understood that the thickness of elements 3 to 8 have been greatly exaggerated in Figure 1 of the drawing for the purpose of clearness of illustration. The connection strips 4, 5 and 6 may be formed in any suitable manner, as by silver paint applied upon the front and rear faces of plate 3. Since the bolometer wire is connected between waveguide sections 1 and 2, which are insulated from each other, the bolometer may be connected in a Wheatstone bridge, or in any other appropriate measuring circuit, by connections to flanges 1a and 2a, or to any other parts of sections 1 and 2 respectively.

A suitable energy dissipating load is arranged within the over-size section 2, and this load may assume the form of a tapered resistive plate 9 mounted within section 2 with its plane parallel with the electric field in the section. Other forms of load may be used.

The operation of the meter may be most simply explained if the capacitance $C_D$ introduced by the step between sections 1 and 2 is initially neglected. The device then consists of a bolometer, which for the moment is assumed to be a constant pure resistance, backed by an over-sized section of guide in which is located a matched load. If the bolometer and load conductances normalized to the guide characteristic admittance are $G_B$ and $G_L$, respectively, then these values are adjusted so that the power meter is matched. That is $$G_B + G_L = 1 \quad (2)$$

Under these idealized conditions the fraction of total power dissipated in the bolometer is given as $$\frac{P_B}{P_T} = G_B \quad (3)$$

and if the power in the bolometer is measured, then the total power dissipated in the meter is $$P_T = \frac{1}{G_B} P_B = R_B P_B \quad (4)$$

From the point of view of power transfer, $G_B$ should be as close to unity as possible, but by Equation 2 this requires $G_L \ll 1$. The physical realization of $G_L$ precludes the possibility that it be made extremely small. This may be seen if it is observed that $G_L$ is the characteristic admittance of the over-sized guide normalized to the main standard guide of characteristic admittance $Y_o$ and $$G_L = \frac{b_1}{b_2} Y_o \quad (5)$$

where $b_1$ and $b_2$ are the heights of the standard and over-sized guides respectively. In the drawing the characters $\alpha$ and $\beta$ represent the normalized admittances $G_B$ and $G_L$ respectively.

If $b_1/b_2$ is made small, the discontinuity capacitive susceptance at the step junction of the two guide sections becomes excessive. This susceptance normalized to the main guide characteristic admittance is $$B_D = \frac{2\pi b_1}{\lambda_g} \log_e \csc \frac{\pi b_1}{2b_2} \quad (6)$$

where $\lambda_g$ is the wavelength in the guide. The value chosen for the height ratio $b_1/b_2$ was 0.5 to compromise between mismatch and power division ratio. With this choice the fraction of total power dissipated in the bolometer is 0.5 and the effective power loss ratio is 3.0 db. The computed Equation 5 value of discontinuity susceptance corresponding to a typical high frequency "edge-of-band" value of $b_1/\lambda_g = 0.635$ is $B_D = 0.110$ which gives a voltage standing wave ratio of approximately 1.13 at the high frequency end of the various bands. Since the finite insertion VSWR of the bolometer must be allowed for, it is clear that a step ratio smaller than 1/2 would make it extremely difficult to obtain a VSWR less than 1.30 at the high frequency end of the band.

According to the embodiment described above, each power meter consists of a bolometer whose R.F. normalized admittance is approximately 0.5 backed by an oversize section of guide whose height is twice that of the main guide and in which is mounted a matched load. The input admittance of the oversized guide is therefore 0.5 and the combination of bolometer and load has a nominal normalized admittance of unity. The power divides so that half the total is dissipated in the bolometer and this power division ratio is a calibration number for the power meter. The loss in overall sensitivity is 3.0 db, but the inherent sensitivity of the bolometers is such that a lower limit of power measurement of 25 microwatts is easily attained. It should be emphasized again that this invention results in a power meter with no tuning adjustments whatever.

In the foregoing, the operation of the power meters is described assuming an ideal constant resistance bolometer with no reactance. Actually, the equivalent circuit of the bolometer is considerably more complicated and the practical design of the bolometer element must take this into account.

The approximate equivalent circuit of the bolometer element may be deduced from the physical structure of the element as shown in Figure 4.

A first order equivalent circuit for the bolometer unit is shown in Figure 5. The shunting capacitor $C_L$ is associated with the lead-in strips, the inductance $L_U$ is due to the unetched silvered section of Wollaston wire, $C_L$ is the capacitance between the lengths of unetched wire and $R_b$ and $L_b$ are the resistance and inductance of the etched length of platinum wire.

A simpler circuit may be used by combining the inductances of the etched and unetched wires, and combining all the capacitances as a single shunt element as shown in Figure 6. The additional errors introduced into the analysis of bolometer perforcance by this simplified circuit are not particularly serious. The remaining discussion of the power meter utilizes the simplified equivalent circuit.

The normalized input admittance of the section of the circuit enclosed by the dashed line rectangle in Figure 5 (this includes the bolometer and the capacitive discontinuity of the step, but does not include the load admittance $G_L$) is given by $$Y_1 = G_o \left( \frac{1+Q^2}{1+\Omega^2 Q^2} - j\Omega Q \left[ \frac{1+Q^2}{1+\Omega^2 Q^2} - 1 \right] \right) \quad (8)$$

$$Q = \frac{\omega_o C}{G_o} = \omega_o L G_B \quad (9)$$

where $G_o$ = Required normalized resonant conductance of bolometer $= 1 - \frac{b_1}{b_2}$ (see Equation 5).

$G_B = \frac{1}{R_B} =$ Normalized deplated bolometer wire conductance.

$b_1, b_2 =$ Heights of standard and over-sized guide sections, respectively.

$\omega_o C =$ Normalized capacitive susceptance at midband.

$1/\omega_o L =$ Normalized inductive susceptance at midband.

$\Omega = \frac{\omega}{\omega_o} =$ Normalized waveguide frequency variable. For the broadband operation contemplated here, the approximate range of $\Omega$ is
$$\frac{2}{3} \leq \Omega \leq \frac{4}{3}$$
with $\Omega = 1$ at mid-band.

Equation is derived by assuming that the bolometer circuit parameters have been adjusted to make the midband admittance (i.e. at $\Omega=1.0$) equal to $G_o+j_o$. Thus, if $$G_L = 1 - G_o \qquad (10)$$

the bolometer is matched. The further approximation is made that normalized capacitive reactance and inductive susceptance are proportional to $\lambda_g$, whereas normalized resistance is invariant with $\lambda_g$.

The total normalized input admittance is $$Y_T = Y_1 + G_L \qquad (11)$$

and the input standing wave ratio $\rho$ and power-multiplying factor M are, respectively $$\rho = \frac{1 + \left|\frac{1-Y_T}{1+Y_T}\right|}{\left|\frac{1-Y_T}{1+Y_T}\right|} \qquad (12)$$

$$M = \frac{\text{Total power}}{\text{Bolometer power}} = \frac{P_T}{P_B} = 1 + \frac{G_L}{G_o}\left(\frac{1+Q^2}{1+\Omega^2 Q^2}\right) \qquad (13)$$

An estimate of power meter performance can be obtained with the air of Equations 8 through 13. It is clear that if the bolometer conductance is designed to be $G_o$ at mid-band, then for any preassigned value of this conductance (e.g. for a ratio of mainguide to over sized guide $$\frac{b_1}{b_2} = \frac{1}{2} = G_o = G_L)$$

the broadband characteristic of the bolometer mount depends only on the value of the parameter Q given by Equation 9. One can estimate the values for Q for the case of $$G_o = \frac{1}{2}$$

by computing the value of the mid-band normalized capacitive discontinuity sesceptance at the junction of main and over-sized guide sections from Equation 6. This value may then be substituted for $\omega_o C$ in Equation 9 to give a lower limit for Q, inasmuch as the capacitance of the bolometer itself is not included in this figure. Using $$G_o = \frac{1}{2}$$

the resultant Q value is of the order of $Q=0.4$. Accordingly, a family of curves are given in Figures 7 and 8 for values of Q of 0.4, 1.0 and 1.5. The curves of Figure 8 show the values of the voltage standing wave ratio ($\rho$), (Equations 12, 11, 8 with $$G_L = G_o = \frac{1}{2}$$

so that $G_L + G_o = 1$), and the curves of Figure 7 show the multiplying factor M (Equations 13 and 9) as a function of normalized frequency over the range 0.667 to 1.33. The actual measured response of a power meter designed for the band 18.0 kmc./sec. to 26.5 kmc./sec. is also given by the dashed curves in both figures for comparison. By comparing the measured and computed curves, it is clear that a value $Q=1.0$ gives the best fit to the experimental data for both $\rho$ and M. For this value of Q the agreement is reasonably close considering the approximate basis of the equivalent circuit.

From the foregoing, it will be seen that for optimum results the bolometer element must present a purely conductive admittance at the mid-band frequency and of a value close to $G_o=0.5$. Also, for the best broadband response, the Q of the bolometer circuit must be as low as possible.

It will be seen that my power meter effects a division of the input power between the bolometer element and the load in guide section 2 in a definite ratio which is characteristic of each meter. The power division ratio $q$ is the ratio between the input power $P_T$ and the power $P_B$ absorbed by the bolometer element. In the example given above, $q$ has a value of 2.

It will be understood that the size of guide section 1 will depend upon the frequency range to be transmitted. Waveguide sizes for different frequency ranges have been standardized according to an accepted classification. For example, a type $RG=52/u$ waveguide having an inside width of 0.900" and a height of 0.400" is used to transmit frequencies in the range of 8.2 to 12.4 kilomegacycles per second. Other types of smaller size are used to transmit wavebands of higher frequencies.

The height of the over-size section 2 will depend upon the desired power division ratio according to the foregoing description.

The length of the over-size section 2 is not critical; it should be long enough to accommodate the load with proper impedance matching, that is, to present at the plane of the bolometer element an impedance equal to $q$ times the characteristic impedance of section 2.

I claim:

1. A power meter for measuring the energy of electromagnetic waves within a certain frequency band comprising, a waveguide including an input section of a size to propagate said band of frequencies, an output section coupled to receive wave energy from said input section and having a substantially larger transverse dimension throughout its length than said input section, thereby providing a discontinuity step at the junction between said sections, a bolometer element mounted in said waveguide substantially in the plane of said step and at the center of said waveguide, means presented exteriorly of said sections for connecting said bolometer element in an indicator circuit, said means comprising a pair of terminal connections extending in opposite directions within said waveguide from said element and parallel with the electric field in said waveguide to absorb a predetermined and substantial fraction of the energy transmitted through said input section, said bolometer element and connections and said discontinuity presenting substantially a purely conductive admittance to said input section at the mid-band frequency, means short-circuiting the end of said output section to provide a terminated line behind said bolometer of a substantially higher characteristic impedance than that of said input section, and an energy dissipating load embodied in said output section for absorbing the remainder of the energy transmitted through said input section.

2. A power meter according to claim 1 wherein said output section has a width equal to the width of said input section and a height substantially greater than the transverse dimension of said input section parallel with the electric field therein.

3. A power meter according to claim 2 wherein the height of said output section is substantially twice that of the input section.

4. A power meter for measuring the energy of electromagnetic waves within a certain frequency band comprising, an input waveguide section of a size to propagate said band of frequencies, an output waveguide section axially aligned with said input section and coupled to receive energy from said input section, said output section having a substantially larger transverse dimension throughout its length than said input section, thereby providing a discontinuity step at the junction between said sections, a sheet of insulating material interposed between said sections, a bolometer wire mounted on one face of said sheet and being arranged parallel with the electric field in said input section, one end of said wire being connected to said input section and the other end to said output section, said bolometer element presenting substantially a purely conductive admittance at the mid-band frequency, and an energy dissipating load embodied in said output section for absorbing a predetermined fraction of the energy transmitted through said input section.

5. A power meter according to claim 4 wherein said output section has a width equal to the width of said input section and a height greater than the transverse dimension of said input section parallel with the electric field therein.

6. A power meter according to claim 5 wherein the height of said output section is substantially twice that of the input section.

7. A power meter for measuring the energy of electromagnetic waves within a certain frequency band comprising, a pair of waveguide sections arranged in axial alignment in energy transfer relation but conductively insulated from each other, one of said sections being an input section and having normal dimensions for propagating said band of frequencies, and the other section being of substantially larger transverse size throughout its length than said input section, thereby providing a discontinuity step at the junction between said sections, a matched load embodied in said other section for absorbing wave energy without substantial reflection, and a bolometer element mounted within the electric field at said step for absorbing a predetermined fraction of the wave energy transmitted through said input section, one terminal of said bolometer being conductively connected to said input section and the other terminal being conductively connected to said output section.

References Cited in the file of this patent

UNITED STATES PATENTS

| | | |
|---|---|---|
| 2,438,915 | Hansen | Apr. 6, 1948 |
| 2,491,669 | Larson | Dec. 20, 1949 |
| 2,524,183 | Wheeler | Oct. 3, 1950 |
| 2,550,689 | Gustafson | May 1, 1951 |
| 2,576,186 | Malter | Nov. 27, 1951 |
| 2,602,828 | Norton | July 8, 1952 |
| 2,624,803 | Howard | Jan. 6, 1953 |
| 2,667,618 | Waller | Jan. 26, 1954 |

UNITED STATES PATENT OFFICE

CERTIFICATE OF CORRECTION

Patent No. 2,899,640 August 11, 1959

Herbert J. Carlin

It is hereby certified that error appears in the printed specification of the above numbered patent requiring correction and that the said Letters Patent should read as corrected below.

Column 4, line 39, for "perforcance" read -- performance --; line 74, for "Equation is" read -- Equation 8 is --; column 5, line 23, for "air" read -- aid --.

Signed and sealed this 15th day of March 1960.

(SEAL)
Attest:
KARL H. AXLINE

Attesting Officer

ROBERT C. WATSON
Commissioner of Patents